US009305168B2

(12) United States Patent
Brucker et al.

(10) Patent No.: US 9,305,168 B2
(45) Date of Patent: Apr. 5, 2016

(54) MODULAR STATIC APPLICATION SECURITY TESTING

(71) Applicants: Achim D. Brucker, Karlsruhe (DE); Thomas Deuster, Billigheim-Sulzbach (DE)

(72) Inventors: Achim D. Brucker, Karlsruhe (DE); Thomas Deuster, Billigheim-Sulzbach (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/932,357

(22) Filed: Jul. 1, 2013

(65) Prior Publication Data

US 2015/0013011 A1 Jan. 8, 2015

(51) Int. Cl.
*H04L 29/00* (2006.01)
*G06F 21/57* (2013.01)
(52) U.S. Cl.
CPC .................................. *G06F 21/577* (2013.01)
(58) Field of Classification Search
CPC ................................ G06F 21/56; G06F 21/00
USPC ........................................................... 726/25
See application file for complete search history.

(56) References Cited

U.S. PATENT DOCUMENTS

| 8,381,242 | B2 * | 2/2013 | Berg et al. | 725/25 |
| 8,528,095 | B2 * | 9/2013 | Haviv et al. | 726/25 |
| 2013/0097706 | A1 * | 4/2013 | Titonis et al. | 726/24 |

OTHER PUBLICATIONS

'Wala—T.J. Watson Libraries for Analysis,' [online]. "Main Page—WalaWiki," Jul. 17, 2013 [retrieved on Jun. 9, 2014]. Retrieved from the Internet: URL http://wala.sourceforge.net, 2 pages.
"IEEE Standard Glossary of Software Engineering Terminology," IEEE Std 610.12-1990Sep. 28, 1990. Office, 121990(1):70, 84 pages.
Allen, "Control Flow Analysis," Proceeding of a symposium on Compiler optimization, ACM, 5:1-19, Jul. 1970.
Askarov and Sabelfeld, "Tight Enforcement of Information-Release Policies for Dynamic Languages," In Computer Security Foundations Symposium, IEEE, 2009 pp. 43-59.
Bessey, "A Few Billion Lines of Code Later: Using Static Analysis to Find Bugs in the Real World," Communications of the ACM, Feb. 2010, 53(2):66-75.
Chess et al., Secure Programming with Static Analysis, Addison-Wesley Professional, May 24, 2007, 56 pages.
Chow and Rudmik, "The design of a data flow analyzer," Proceedings of 1982 SIGPLAN symposium on Compiler construction, vol. 17 of SIGPLAN '82, pp. 106-113, New York, NY, USA, Jun. 1982. ACM.

(Continued)

*Primary Examiner* — Brandon Hoffman
*Assistant Examiner* — Michael D Anderson
(74) *Attorney, Agent, or Firm* — Fish & Richardson P.C.

(57) ABSTRACT

Methods, systems, and computer-readable storage media for analyzing source code of an application. In some implementations, actions include determining, for at least one procedure invoked by the source code, a procedure specification specifying one or more conditions under which one or more parameters of the procedure are exploitable according to a parameter security specification; performing static application security testing on the source code by using the procedure specification on reaching an invocation of the procedure in the source code, including: comparing one or more invoking parameters of the invocation of the procedure to the conditions of the procedure specification; and determining whether the invocation of the procedure is exploitable.

14 Claims, 5 Drawing Sheets

(56) References Cited

OTHER PUBLICATIONS

Cytron, "Efficiently Computing Static Single Assignment Form and the Control Dependence Graph," ACM Transactions on Programming Languages and Systems, Mar. 1991, 13(4):451-490.
Denning et al., Certification of Programs for Secure Information Flow, Communications of the ACM, Jul. 1977, 20(7):504-513.
Denning, A Lattice Model of Secure Information Flow. Communications of ACM, May 1976, 19(5):236-243.
Engler et al., Checking System Rules Using System-Specific, Programmer-Written Compiler Extensions, In Proceedings of the 4th conference on Symposium on Operating System Design & Implementation, 2000.
Engler, et al., "Bugs as Deviant Behavior: A General Approach to Inferring Errors in Systems Code," ACM ISBN, Oct. 2001, pp. 57-72.
EU-Project Aniketos Secure and Trustworthy Composite Services. Models and methodologies for embedding and monitoring trust in services. Deliverable D2.1, Jul. 2011. URL http://www.aniketos.eu/content/deliverables. Seventh Framework Programme, 2 pages.
Foster et al., "A Theory of Type Qualifiers," In Proceedings of the ACM SIGPLAN 1999 Conference on Programming Language Design and Implementation (PLDI), May 1999, pp. 192-203.
Foster et al., Flow-Insensitive Type Qualifiers, ACM Trans. Program. Lang. Syst., 28(6), Nov. 2006. 1035-1087.
Grove et al., Call Graph Construction in Object-Oriented Languages, In ACM SIGPLAN Notices, vol. 32, 1997, pp. 108-124.
Heckman et al., "A systematic literature review of actionable alert identification techniques for automated static code analysis," Information and Software Technology, Apr. 2011, 53(4):363-387.
Huang et al., "Securing Web Application Code by Static Analysis and Runtime Protection," In Proceedings of the 13th International Conference on World Wide Web, ACM, May 2004, pp. 40-52.
Larochelle et al., "Statically Detecting Likely Buffer Overflow Vulnerabilities," In Proceedings of the 10th conference on USENIX Security Symposium—vol. 10, 2001, 14 pages.
Livshits and Lam, "Finding Security Vulnerabilities in Java Applications with Static Analysis," In Proceedings of the 14th conference on USENIX Security Symposium, 2005, 14:271-286.
Martin et al., "Finding Application Errors and Security Flaws Using PQL: A Program Query Language," ACM, 2005, 19 pages.
Mead and McGraw, "A Portal for Software Security," IEEE Security and Privacy, Jul. 2005, 3(4):75-79, ISSN 1540-7993.
Myers, "Jflow: practical mostly-static information flow control," Proceedings of 26th ACM SIGPLAN-SIGACT symposium on Principles of Programming Languages, vol. 26 of POPL '99, pp. 228-241, New York, NY, USA, Jan. 1999. ACM.
Ørbæk, "Can you trust your data?" Proceedings of 6th International Joint Conference CAAP/FASE on Theory and Practice of Software Development, TAPSOFT '95, pp. 575-589, London, UK, UK, 1995. Springer-Verlag. http://dl.acm.org/citation.cfm?id=646619.697559.
Pistoia et al., "A survey of static analysis methods for identifying security vulnerabilities in software systems," IBM Systems Journal, 46(2): 265-288,2007.
Reps et al., "Precise interprocedural dataflow analysis via graph reachability," In Proceedings of the 22nd ACM SIGPLAN-SIGACT symposium on Principles of programming languages, AMC, 1995, pp. 49-61.
Ryder, "Constructing the call graph of a program," IEEE Transactions on Software Engineering, 5(3):216-226, May 1979.
Sabelfeld and Russo, "From dynamic to static and back: Ridign the roller coaster of information-flow control research," Perspectives of Systems Informatics, pp. 352-365, 2010.
Schaefer, "The complexity of satisfiability problems," In Proceedings of the tenth annual ACM symposium on Theory of computing, 1978, pp. 216-226.
Shankar et al., "Detecting format string vulnerabilities with type qualifiers," In Proceedings of the 10th conference on USENIX Security Symposium—vol. 10, SSYM'01, pp. 16-16, Berkeley, CA, USA, 2001. USENIX Association. URL http://dl.acm.org/citation.cfm?id=, 16 pages.
Viega et al., "Its4: A static vulnerability scanner for c and c++ code," In Computer Security Applications, 2000. ACSAC'00. 16th Annual Conference, pp. 257-267. IEEE, 2000.
Vigna, "Static disassembly and code analysis," Malware Detection—Advances in Information Security, 2007, 27:19-41.
Whaley and Lam, "Cloning-based context-sensitive pointer alias analysis using binary decision diagrams," SIGPLAN Not., 2004, 39(6):131-144.

* cited by examiner

*FIG. 5* exploitable in at least one context.

MODULAR STATIC APPLICATION SECURITY TESTING

BACKGROUND

Static Application Security Testing (SAST) is a technique that statically analyzes program source code to detect problems within the source code. That is, SAST performs such analysis without actually executing (running) the source code. In some examples, problems within the source code can compromise the security of a computer program. Such problems can be caused by unchecked (un-validated) data-flows from a sink, e.g., input from a user, to a source, e.g., access to a database.

SUMMARY

Implementations of the present disclosure include computer-implemented methods for analyzing source code of an application. In some implementations, actions include determining, for at least one procedure invoked by the source code, a procedure specification specifying one or more conditions under which one or more parameters of the procedure are exploitable according to a parameter security specification; performing static application security testing on the source code by using the procedure specification on reaching an invocation of the procedure in the source code, including: comparing one or more invoking parameters of the invocation of the procedure to the conditions of the procedure specification; and determining whether the invocation of the procedure is exploitable.

In some implementations, performing static application security testing on the source code comprises: reaching at least first and second invocations of the procedure in the source code; using the procedure specification to determine whether each of the first and second invocations of the procedure are exploitable according to the parameter security specification without accessing the source code of the procedure. In some implementations, the actions further include determining a respective module specification for each module of a plurality of modules of the source code. In some implementations, the parameter security specification specifies one or more types of data sources as being unsafe data sources. In some implementations, the parameter security specification specifies one or more types of data sinks as being vulnerable data sinks. In some implementations, determining whether the invocation of the module is insecure comprises: determining that a first invoking parameter has a data type specified by the parameter security specification as an exploitable data source; determining, using the module specification, that the first invoking parameter forms a data flow to a first parameter of the module specified by the parameter security specification as being an exploitable data sink, thereby determining that one or more conditions specified in the module specification are met for the invocation of the module. In some implementations, the actions further include for each procedure of the source code, combining return statements so that each procedure has one return statement. In some implementations, the actions further include generating an intermediate representation of the source code independent of a programming language used to write the source code of the at least one procedure. In some implementations, the intermediate representation of the source code is based on the T. J. Watson Libraries for Analysis (WALA) infrastructure. In some implementations, the intermediate representation is designed in a single static assignment (SSA) form. In some implementations, the actions further include determining a control flow graph of the at least one procedure using the source code of the application, wherein the control flow graph includes a plurality of nodes each representing a linear sequence of instructions and a plurality of edges connecting nodes, each edge representing an invocation of one connected node's instructions by the other connected node's respective instructions. In some implementations, the actions further include incorporating an identification of a sanitization procedure into the specification of the at least one procedure.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to finding security vulnerabilities using static analysis techniques. An application analysis system uses defined characteristics to identify data sources and sinks as potentially exploitable. The system transforms an application's source code into a standardized intermediate representation and a corresponding control flow graph.

The system analyzes exploitable data sinks to determine whether they have an exploitable data source as a predecessor in the control flow graph or not. The system can analyze exclusion criteria to determine if the potential exploitable source-sink pairs are exploitable in at least one possible context. If a source-sink pair is not exploitable in at least one possible context, the system can determine that the source-sink pair is not potentially exploitable. This is useful, for example, to reduce the number of false positives in a security report, and to provide explanations of security vulnerabilities to developers.

The system can describe procedures in the source code in a standardized way by generating procedure specifications. The specifications are created so that each possible invoking context is defined explicitly with the security information determined accordingly. This is useful, for example, so that different analysis methods do not have to analyze the procedure more than once.

Figure 1:
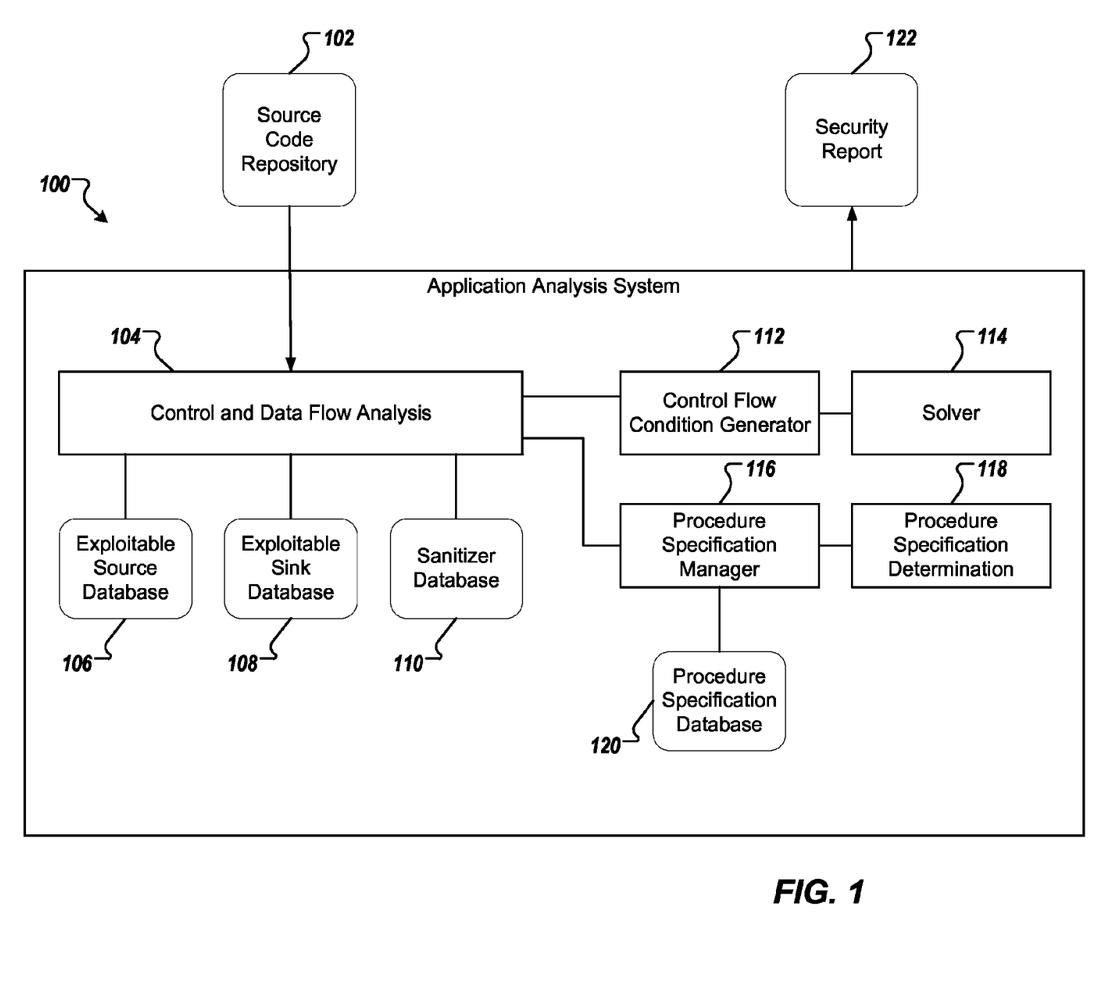
FIG. 1 depicts an example application analysis system in accordance with implementations of the present disclosure.

FIG. 1 depicts an example application analysis system 100 in accordance with implementations of the present disclosure. The application analysis system 100 is configured to analyze application source code stored in a source code repository 102 using SAST. The application analysis system 100 generates a security report 122. One or more developers of the source code can read the security report 122, e.g., to remove security vulnerabilities from the application.

The application analysis system 100 includes a control and data flow analysis module 104. The control and data flow analysis module 104 determines a control flow graph of the application using the source code. The control flow graph includes procedure nodes each representing a respective procedure of the application and edges connecting procedure nodes. Each edge represents an invocation of one connected node's respective procedure by the other connected node's respective procedure. Control flow graphs are discussed further below with reference to FIG. 2.

The application analysis system 100 includes an exploitable source database 106, an exploitable sink database 108, and a sanitizer database 110. The databases can be populated, e.g., by one or more software developers. The exploitable source database 106 specifies data sources that are potentially exploitable. An example of a potentially exploitable data source is an HttpServletRequest object in Java, but the exploitable source database 106 can specify a variety of types of data sources.

The exploitable sink database 108 specifies data sinks that are potentially exploitable. An example of a potentially exploitable data sink is a call to a Structured Query Language (SQL) database, but the exploitable sink database 108 can specify a variety of types of data sinks. The sanitizer database 110 specifies procedures that protect an exploitable data sink from an exploitable data source, e.g., by removing or transforming certain kinds of data.

The control and data flow analysis module 104 uses the exploitable source database 106 and the exploitable sink database 108 to determine source-sink pairs of exploitable data sources and exploitable data sinks in the application. Each source-sink pair includes a respective exploitable data source passed from a respective invoking procedure to a respective exploitable data sink of a respective invoked procedure.

The application analysis system can include a control flow condition generator 112 and a solver 114 to determine, for each source-sink pair, whether the source-sink pair is potentially exploitable in the application. The control flow condition generator 112 determines one or more conditions under which the invoking procedure passes the exploitable data source to the exploitable data sink of the invoked procedure. The solver 114 determines, using the control flow graph, whether the conditions are met in at least one possible context of the application. The solver 114 can be, for example, a Satisfiability Module Theories (SMT) solver. A satisfiabiltiy (SAT) solver or a generic constraint solver can be used as well.

If the conditions are met in at least one possible context, then the application analysis system determines that the source-sink pair is potentially exploitable. The application analysis system can specify in the security report 122 the source-sink pairs determined to be potentially exploitable. The application analysis system 100 can exclude from the security report 122 the source-sink pairs that are not determined to be potentially exploitable, which can reduce the number of false positives in the report. The application analysis system 100 can also include, with each source-sink pair in the security report 122, the conditions under which the invoking procedure passes the exploitable data source to the exploitable data sink of the invoked procedure, which can be useful to a developer reviewing the report.

The application analysis system 100 can include a procedure specification manager 116 and a procedure specification determination module 118. The procedure determination module 118 determines, for at least one procedure invoked by the source code and as many as all of the procedures invoked by or specified by the source code, a procedure specification specifying one or more conditions under which one or more parameters of the procedure are potentially exploitable according to a parameter security specification, e.g., the exploitable source database 106 and the exploitable sink database 108.

The procedure specification manager 116 stores procedure specifications in a procedure specification database 120 and retrieves the procedure specifications as needed for the application analysis system 100. The application analysis system 100 performs SAST on the source code by using the procedure specification for a procedure on reaching an invocation of the procedure in the source code. The application analysis system 100 compares one or more invoking parameters of the invocation of the procedure to the conditions of the procedure specification and determines whether the invocation of the procedure is exploitable. The application analysis system does not have to analyze the procedure more than once for the source code testing.

Figure 2:
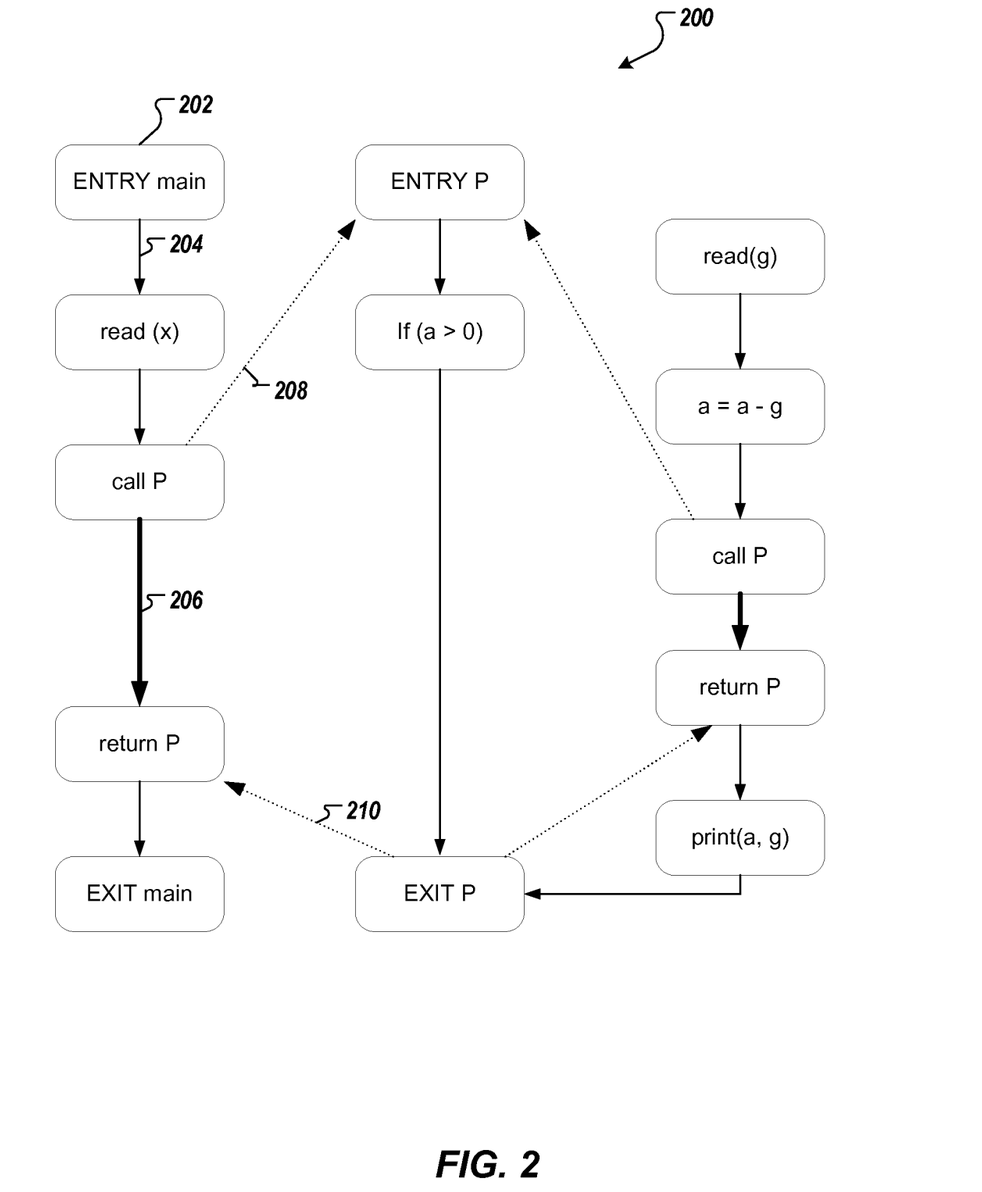
FIG. 2 depicts an example control flow graph of an example application.

FIG. 2 depicts an example control flow graph 200 of an example application. The control flow graph can be considered a super graph because it includes one or more procedures. Example source code for the example application reads as follows:

```
static int g;
procedure main( ){
    int x;
    read(x);
    P(x);
}
procedure P(int a){
    if(a>0){
        read(g);
        a = a - g;
        P(a)
        print(a, g)
    }
}
```

The example control flow graph is a directed graph where the nodes represent procedures, e.g., 202. In some implementations, each node represents a linear sequence of program instructions—a basic block, which can be defined by a single entry point, e.g., first instruction executed, and a single exit point, e.g., last instruction executed. The nodes are connected by directed edges, e.g., 204, that represent the control flow of the program. For example, an edge can represent that one procedure calls another procedure.

In some implementations, each procedure call within the application is represented by three edges: an intra-procedural edge from the call node to the return node, e.g., 206; an inter-procedural edge from the procedure call node to the entry node of a control flow graph for the procedure, e.g., 208; and an inter-procedural edge from the exit of the procedure's control flow graph to the return node, e.g., 210.

Figure 3:
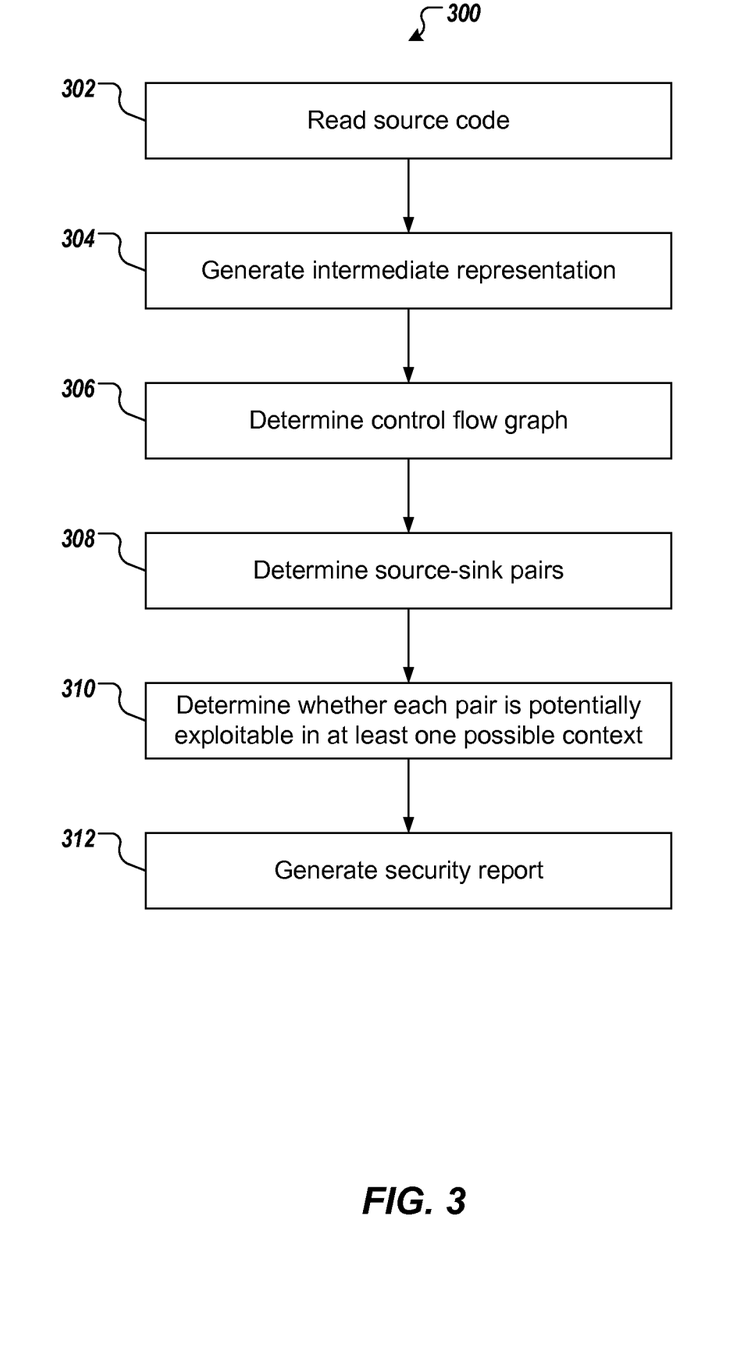
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. For purposes of illustration, the process 300 will be described with respect to a system that performs the process 300, e.g., the application analysis system 100 of FIG. 1.

The system reads source code of application (302). For example, the system can read the source code from a source code repository, e.g., the source code repository 102 of FIG. 1.

The system generates an intermediate representation of the source code (304). The intermediate representation is independent of a programming language used to write the source code. This is useful, e.g., so that later steps of the process 300 do not have to depend on features specific to various programming languages.

For example, the system can use techniques based on the T. J. Watson Libraries for Analysis (WALA) infrastructure. In some implementations, the intermediate representation is designed in a single static assignment (SSA) form, which can replace a static abstraction with a set of symbolic registers. The SSA symbols can be stateless and represent the same value at any time. The system can use various other forms of conventional intermediate representations.

The system determines a control flow graph for the application (304). For example, the control flow graph can be similar to the control flow graph 200 of FIG. 2. The control flow graph includes procedure nodes each representing a respective procedure of the application and edges connecting procedure nodes. Each edge represents an invocation of one connected node's respective procedure by the other connected node's respective procedure.

The system determines source-sink pairs of exploitable data sources and exploitable data sinks (308). In some examples, the system determines the source-sink pairs in four steps: reducing the control flow graph to an actual control flow between an entry node and an exit node; building an adjacency list; identifying exploitable data sinks; and identifying possible vulnerabilities. Example algorithms are set forth below in pseudo code but the system can use other algorithms.

Algorithm B.1 demonstrates an example reduction method. This algorithm uses the prior initialized parameter control flow graph $G\_=\{V,E\}$, entry node s as the current node c, the exit node t and the exclusion list X. The fifth parameter, used in this step, is the set of relevant nodes $V_r$. The subscript in indicates parameter, which need to be set before the call, whereas subscript out indicates, that the parameter needs to be passed to the algorithm as an output parameter (or by reference).

The set $V_r$ is initially an empty set. The algorithm fills this set with every node that is on a path between s and t. Algorithm B.1 performs a depth first search (DFS) on the control flow graph, starting with the specified entry point s. During the DFS, every single reachable node between s and t will be added to $V_r$.

The first if block has two distinct purposes. It will prevent the algorithm from getting into an endless loop, if the control flow graph contains circles and ensures the termination at the exit node t as well. After termination of the algorithm, the set $V_r$ contains every node between s and t, except for t itself. For the next step, it is useful, to add t to the set as well.

| Algorithm B.1 reduceControlgraph (in: G*, c, t, X out: V$^r$) |
|---|
| 1:     if c ∈ V$^r$ OR c = t then▷ c was either visited already or |
|                            is exit node |
| 2:        return |
| 3:     end if |
| 4:     V$^r$ = V$^r$ ∪ {c}; |
| 5:     for all (u, v) ∈ E* s.t. u = c do▷ for each child of c |
| 6:        if method of u ∉ X then |
| 7:            reduceControlgraph(G*, v, t, X, V$^r$);▷ recursive |
|                            call with child as current node |
| 8:        end if |
| 9:     end for |

Algorithm B.2 is an example of building the adjacency list. $V_u^r$ is a list of all the children nodes of the node u, which are still available in the reduced graph, i.e., $V_u^r = \cup_{v \in V^r}$ s.t.∃(u,v)∈E*. $A^r = \cup_{u \in V^r} \{(u, V_u^r)\}$. is a set of tuples with one tuple for each node in the reduced graph. Each tuple (u, $V_u^r$) contains the node itself as well as the prior defined set of children $V_u^r$. The algorithm receives a reference to an empty adjacency list, generates the set of children $V_u^r$ for each relevant node u locally and then adds the tuple (u, $V_u^r$) to Ar.

| Algorithm B.2 buildAdjList (in: V$^r$, E* out: A$^r$) |
|---|
| 1:     for all c ∈ V$^r$ do |
| 2:        V$_c$ = ∅ is the list of children of c. |
| 3:        for all (u, v) ∈ E* s.t. u = c∧ v ∈ V$^r$ do▷ for each |
|                           relevant child of c |
| 4:           if v ∉ V$_c$ then |
| 5:             V$_c$ = V$_c$ ∪ {v}; |
| 6:          end if |
| 7:        end for |
| 8:        A$^r$ = A$^r$ ∪ {(c, V$_c$)}. |
| 9:     end for |

Algorithm B.3 checks every node, which is marked as relevant, if it contains an instruction which can be used as an exploitable data sink. The set of bad (exploitable) data sinks $B^t$ is a set of SSA instructions that could be exploited. The set includes SSA instructions instead of nodes because a single node represents a sequence of SSA instructions and not all of them are exploitable. The algorithm starts with an empty set of bad sinks and fills the set step by step.

| Algorithm B.3 identifyBadSinks (in: V$^r$ out: B$^t$) |
|---|
| 1:     for all v ∈ V$^r$ do |
| 2:        for all SSA instructions i in v do |
| 3:           if isBadSink(i) then |
| 4:             B$^t$ = B$^t$ ∪ {i}; |
| 5:          end if |
| 6:        end for |
| 7:     end for |

Algorithm B.4 combines exploitable sinks with exploitable data sources that could be used to exploit the sink. The algorithm uses a set of bad sources $B^{s,i}$ that is populated for every bad sink. The set is a set of SSA instructions that are marked as bad sources. The algorithm also uses a Def-Use object D that contains the definition and the users of each SSA value or SSA instruction and is built by iterating through the symbol table S. The Def-Use object allows a more direct access to the information in the symbol table.

| Algorithm B.4 calculateBadSources (in: i, D out: $B^{s,i}$) |
| --- |
| 1:     j = D.def(i); ▷ j is the SSA instruction with id i |
| 2:     if j = NULL then ▷ id j represents a SSA symbol |
| 3:         return false; |
| 4:     else |
| 5:         isVulnerable = false; |
| 6:         if isBadSource(j) then |
| 7:             $B^{s,i} = B^{s,i} \cup \{j\}$; |
| 8:             isVulnerable = true; |
| 9:         else ▷ id j represents a SSA instruction that is not of current interest |
| 10:             for all ids k ∈ D.uses(i) do |
| 11:                 isVulnerable = isVulnerable \| calculateBadSources(k, D, $B^{s,i}$); |
| 12:             end for |
| 13:         end if |
| 14:         return isVulnerable; ▷ return value is only used in recursion |
| 15:     end if |

A vulnerability w=(s, t) is a tuple of a bad source s and a bad sink t. Since algorithm B.4 analyzed only one bad sink at the time and computes a corresponding set of possible bad sources, it needs to be invoked for each bad sink individually. Algorithm B.5 handles this task and collects the vulnerabilities in the set W. It iterates over the set of bad sinks and algorithm B.4 is invoked in each iteration to calculate the corresponding bad sources $B^{s,i}$ for the bad sink i. Thereafter, every bad source is transformed into the tuple (s, t) and added to the set W.

| Algorithm B.5 getVulnerabilities (in: $B^t$, D out: W) |
| --- |
| 1:     W = ∅; |
| 2:     for all t ∈ $B^t$ do ▷ for each bad sink |
| 3:         i = id of t; |
| 4:         $B^{s,i}$ = ∅; |
| 5:         calculateBadSources(i, D, $B^{s,i}$); |
| 6:         for all s ∈ $B^{s,i}$ do |
| 7:             W = W ∪ {(s, t)}; ▷ fill the set W with all possible source sink pairs |
| 8:         end for |
| 9:     end for |

The system determines whether each source-sink park is potentially exploitable in at least one possible context (310). For example, whenever a data source is only reached if a specific condition is satisfied and the corresponding data sink requires a condition as well, then the system can check those two conditions in a combined manner. If the two conditions cannot be satisfied at the same time, then source-sink pair is not exploitable. Example algorithms are set forth below in pseudo code but the system can use other algorithms.

Algorithm C.1 will be invoked for each conditional branch node of the reduced graph, described above with reference to step 308, and computes the corresponding condition cv. This resulting pairs (v, cv) are then combined into the list Cb.

| Algorithm C.1 getConditionForBranch (in: D, i): condition |
| --- |
| 1:     j = D.def(i); ▷ j is the instruction for id i |
| 2:     if j == NULL then ▷ j is an SSA symbol |
| 3:         if j is constant then |
| 4:             return value of j; |
| 5:         else |
| 6:             return "v" + i; ▷ "v" + i is a unique id for the symbol j |

| Algorithm C.1 getConditionForBranch (in: D, i): condition |
| --- |
| 7:         end if |
| 8:     else if j is unary instruction then ▷ the IR uses unary instructions for negation |
| 9:         let k be the only used id of j. |
| 10:         return ¬ ConditionsForBranches(D, k); |
| 11:     else if j is binary instruction then |
| 12:         let $k_i$ be the ith used id of j; |
| 13:         o = getCorrespondingOperator(j); |
| 14:         return getConditionsForBranches(D, $k_1$) + o + getConditionsForBranches(D, $k_2$); |
| 15:     else if j is Φ-function then |
| 16:         tmp = ∅; |
| 17:         for all uses $k_i$ of j do |
| 18:             tmp ∪ getConditionsForBranches(D, $k_i$); |
| 19:         end for |
| 20:         return a combined condition of tmp with the operator V; |
| 21:     else |
| 22:         return "v" + i; ▷ this is an approximation for e.g. invoked excluded procedures |
| 23:     end if |

Once the list Cb is determined, the system determines the ids of the conditional branch nodes, which need to be satisfied for each node of the reduced graph. Algorithm C.2 determines this list of ids. Algorithm C.2 is a recursive algorithm that starts at the entry node of the reduced graph and runs through each possible control flow, using an alteration of depth first search (DFS). The algorithm uses the regular DFS until it reaches a branching node, which occurs for if-blocks within the program. At these nodes the algorithm continues the DFS with the first node of the if-block up to the node where the two branches join. The alteration causes the algorithm to jump back to the branch instead of continuing with the path. Afterwards, the analysis will continue with the else-block, if it exists or the join node otherwise.

| Algorithm C.2 computeConditionsForControlGraph (in: G', i, t, C out: N) |
| --- |
| 1:     if i == t then |
| 2:         return ; |
| 3:     end if |
| 4:     $c_s = 0, c_t = 0$; |
| 5:     if C ≠ ∅ then ▷ i is within at least one if-[else-]block |
| 6:         let $c_s$ be the start id of the most inner if-block and $c_t$ the end id. |
| 7:         if i > \|$c_t$\| then ▷ most inner if-block has else and current node is join |
| 8:             C = C\{($c_s, c_t$)} ∪ {($c_s$, i)}; |
| 9:             return; |
| 10:         else if i == $c_t$ then ▷ end of single if-block |
| 11:             return ; |
| 12:         else if i == −$c_t$ then ▷ end of else-block |
| 13:             delete all conditions in C, that end at the current node. |
| 14:         end if |
| 15:     end if |
| 16:     let $C_i$ be a list containing the id of each pair of the current conditions C. |
| 17:     N = N ∪ {$C_i$}; |
| 18:     if i represents a conditional branch instruction then |
| 19:         $v_1$ is the child of i in G' with the lower id and $v_2$ the on with the higher id. |
| 20:         C = C ∪ {(i, $v_2$)}; |
| 21:         computeConditionsForControlGraph(G', $v_1$, t, C, N); |
| 22:         let $c_i$ be the end id for i in C. |
| 23:         C = C\{(i, $c_i$)} |
| 24:         if $c_i$ ≠ $v_2$ then ▷ there is an else-block, in case the end id had changed |
| 25:             C = C ∪ {(−i,−$c_i$)}; |
| 26:         end if |

| Algorithm C.2 computeConditionsForControlGraph (in: G', i, t, C out: N) | |
|---|---|
| 27: | computeConditionsForControlGraph(G', $v_2$, t, C, N); |
| 28: | return ; |
| 29: | else if i represents a goto instruction then |
| 30: |    let v be the child of i in G'. |
| 31: |    if i == $|c_t|$ − 1 then ▷ i is last known node of if-block |
| 32: |      if $|c_t| \neq$ v then |
| 33: |         if v <= $|c_s|$ then ▷ is loop |
| 34: |            return ; ▷ return to avoid an endless loop |
| 35: |         end if |
| 36: |         C = C\{($c_s$, $c_t$)} ∪ {($c_s$, v)}; |
| 37: |      end if |
| 38: |      return ; |
| 39: |    end if |
| 40: | end if |
| 41: | for all child v of i in G' do |
| 42: |    computeConditionsForControlrGraph(G', v, t, C, N); |
| 43: | end for |

In the next step, the algorithm considers the instruction of the current node and checks, whether it is an instruction, that impacts the control flow, or not. The most frequent implications are the conditional branch instructions. In that case, the set of current conditions C is extended by the pair (i, v2)–v2 is the child of i with the larger id—and the DFS is continued with the recursive call using v1 as the next current id. As described above, the recursive call for the if-block is definitely returning directly after the last node inside this block. If the end id of the corresponding pair inside the set C was altered, the if-block has an else-block and the existing pair (i, ci) will be replaced by the pair (−i, −ci) to indicate the else-block for the following analysis. In case the end id was not altered, the existing pair will be removed without substitution. Either way, the analysis continues the recursion using the second child of the branch with the id v2.

Another special case is the goto instruction, which can be added by the intermediate representation, even if the original programming language does not support them. The first purpose of this instructions is to determine the control flow for the false-part of single if-blocks to jump over the true-part. The second purpose is to define loops, which are represented by self-referring conditional branches and goto instructions to jump back. In the first case, the algorithm will replace the end id of the corresponding condition with the only child of the goto node. Since the analysis does not handle loops and the recursion itself would end up in an infinite loop, the regarding goto instructions will be ignored completely. If no special case or instruction is encountered for the analyzed node, the algorithm will continue with the children of the node.

Once the additional information about the required conditions of each node of the graph are computed, the first step to reduce the amount of false positive is to analyze the source-sink pairs. These pairs (s, t) represent possible vulnerabilities with s as an unsafe data source and t as an exploitable sink, where there exists a path between s and t in the graph. Section B introduced the algorithm, which is used to compute the set of possible vulnerabilities W. These pairs are computed with the backward slice technique, which solely relies on the intermediate representation. As a consequence, the set W can contain pairs, that are theoretically on a concrete path, but practically could not be executed in an exploitable way.

Algorithm C.3 treats every source-sink pair of the passed set of pairs W individually and includes it into the reduced set Wr, if and only if the combined conditions of source and sink are satisfiable. In order to decide the satisfiability, the algorithm retrieves the required condition-ids, using the node-to-condition-id mapping N, which is computed by algorithm C.2. This mapping contains a set of ids (negative ids) of conditional branches for each node, which need to be satisfied (unsatisfied) for the node to be reached. To get the actual conditions, the algorithm uses the set of id-to-condition mapping Cb and negates it, if the id in N was negative. At the end of each analyzed pair (s, t), the algorithm invokes the helper procedure isSatisfiable which then determines, whether there exists at least one possible context where the data of source s is are actually used by sink t.

| Algorithm C.3 analyzePairs (in: N, $C_b$, W): set of vulnerabilities | |
|---|---|
| 1: | $W^r$ = ∅; |
| 2: | for all (s, t) ∈ W do |
| 3: |    $i_s$ = id of the graph node for instruction s; |
| 4: |    $i_t$ = id of the graph node for instruction t; |
| 5: |    $C_{id} = C_{i_s} \cup C_{i_t}$ s.t. $C_{i_s}, C_{i_t} \in$ N; |
| 6: |    $C_f$ = ∅; |
| 7: |    for all k ∈ $C_{id}$ do ▷ for each condition-id |
| 8: |      $c_k$ = the condition for k in $C_b$; |
| 9: |      if k < 0 then |
| 10: |         $c_k = \neg c_k$; |
| 11: |      end if |
| 12: |      $C_f = C_f \cup c_k$; |
| 13: |    end for |
| 14: |    if isSatisfiable($C_f$) then |
| 15: |      $W^r = W^r \cup$ (s, t); |
| 16: |    end if |
| 17: | end for |

In some implementations, the system determines whether data flowing from an exploitable source to an exploitable sink has been sanitized. For example, the system can check all possible paths from a source to a sink and determine whether the used data is sanitized or not. Example algorithms are set forth below in pseudo code but the system can use other algorithms.

Algorithm C.4 starts by checking each data flow path for invoked returning sanitizers. In case there is such an invocation, this data flow path will be marked as sanitized, since there is no way this path is a vulnerability. The algorithm then analyzes each control flow path independently in order to identify modifying sanitizers. Before the actual analysis starts, the algorithm uses the helper procedure isPossibleFlow to determine, if pc is actually possible, due to the combination of conditional branches, it runs through.

| Algorithm C.4 isSanitized (in: $P_c$, $P_d$, $S_r$, $S_m$, D, $C_b$, N, G'): boolean | |
|---|---|
| 1: | for all $p_d \in P_d$ do |
| 2: |    if ∃s ∈ $S_r$: s is invoked in $p_d$ then |
| 3: |      $P_d^s = P_d^s \cup \{p_d\}$; |
| 4: |    end if |
| 5: | end for |
| 6: | if $\forall p_d \in P_d: p_d \in P_d^s$ then ▷ no unsanitized data flow paths |
| 7: |    return true; |
| 8: | end if |
| 9: | for all $p_c \in P_c$ do |
| 10: |    if isPossibleFlow($p_c$, $C_b$, N) then |
| 11: |      $P_d{'}$ = getCorrespondingDataFlowPaths($p_c$, $P_d$', D, G'); |
| 12: |      λ = getSanitizedSymbols($p_c$, $S_m$, D); |
| 13: |      for all $p_d \in P_d^r$ do |
| 14: |         if $p_d \cap \lambda \neq \emptyset$ then |
| 15: |            $P_d^s = P_d^s \cup \{p_d\}$; |
| 16: |         end if |

| Algorithm C.4 isSanitized (in: $P_c$, $P_d$, $S_r$, $S_m$, D, $C_b$, N, G'): boolean |
|---|
| 17:          $C_{p_d}$ = set of condition ids, directly required by $p_d$; |
| 18:          $C^n_{p_d}$ = every single condition id in $C_{p_d}$ multiplied with −1. |
| 19:          for all $P_d' \in P_d \setminus \{p_d\}$ do |
| 20:            $C_{p'_d}$ = set of condition ids, directly required by $P'_d$; |
| 21:            if $p_d \neq P_d'$ then ▷ not for equivalent data flow paths |
| 22:              $C'_{p'd} = C'_{p'd} \cup C^n_{pd}$; |
| 23:            end if |
| 24:          end for |
| 25:        end for |
| 26:      end if |
| 27: end for |
| 28: for all $p_d \in P_d \setminus p_d^s$ do |
| 29:      if isSatisfiable($C_{P_d}'$) then |
| 30:          return false; ▷ this data flow path is not sanitized and not impossible |
| 31:      end if |
| 32: end for |
| 33: return true; ▷ no unsanitized paths |

Algorithm C.5 starts by iterating over the nodes of pc to combine all the condition-ids, the path requires to be satisfied. This information is gathered by using the previously calculated node-to-condition-id mapping N. Hereafter, the list of condition-ids contains every condition that needs to be satisfied in order to reach every node of pc. This information alone is not sufficient to define the path uniquely. The set of conditions additionally requires the negative ids of all conditional branches on the path that are not yet in the set. These negative ids represent all the unsatisfied if-clauses on the control flow that do not have an else-part. When these ids are included, the set also contains every condition that needs to be unsatisfied, to define which nodes are not reached by the path.

The algorithm then uses the id-to-condition mapping to retrieve a set of actual conditions for these ids. As introduced, the negative ids define unsatisfied if-clauses, so the corresponding condition will be negated. Once all the conditions are combined in set C, the algorithm uses the previously defined procedure isSatisfiable to determine the satisfiability of C and thereby the decision, whether the control flow is possible, or not.

| Algorithm C.5 isPossibleFlow (in: $p_c$, $C_b$, N): boolean |
|---|
| 1:    $I = \emptyset$; |
| 2:    for all $v \in p_c$ do |
| 3:        Cv = list of condition ids of v in N. |
| 4:        for all $i \in$ Cv do |
| 5:            if $i \notin I$ then |
| 6:                $I = I \cup \{i\}$; |
| 7:            end if |
| 8:        end for |
| 9:    end for |
| 10: for all $v \in p_c \wedge v$ is conditional branch do |
| 11:      i = id of node v; |
| 12:      if $i \notin I$ then |
| 13:          $I = I \cup \{-i\}$; ▷ not satisfied if-clause without actual else-block |
| 14:      end if |
| 15: end for |
| 16: $C = \emptyset$; |
| 17: for all $i \in I$ do |
| 18:      $c_i$ = condition of id i in $C_b$. |
| 19:      if i < 0 then |
| 20:          $C = C \cup \{\neg c_i\}$; |
| 21:      else |
| 22:          $C = C \cup \{c_i\}$; |
| 23:      end if |
| 24: end for |
| 25: return isSatisfiable(C) ; |

Algorithm C.6 demonstrates the correlation between data flow and control flow and identifies the corresponding data flow paths, which are achievable for the given control flow path. Every data flow path $p_d$ needs an underlying control flow path of the program to be executed. Since the data flow paths are computed by using the backward slice technique, and the backward slice is computed by using the intermediate representation, the information of the Def-Use object D are sufficient, to trace back each symbol of the data flow path to the corresponding SSA instruction. The algorithm then uses the reduced graph Gr to link this instruction back to the actual node. Once all SSA symbols of a data flow path $p_d$ are translated to their nodes, the algorithm can decide, whether $p_d$ is possible for the given control flow path $p_c$ by simply checking, if each node of $p_d$ is part of $p_c$ as well.

| Algorithm C.6 getCorrespondingDataFlowPaths (in: $p_c$, $P_d$, D, G'): set data flow paths |
|---|
| 1:    $P_d^r = \emptyset$; |
| 2:    for all $p_d \in P_d$ do |
| 3:        $V = \emptyset$; |
| 4:        for all $s \in p_d$ do |
| 5:            i = D.def(s); |
| 6:            v = node of i in G'; |
| 7:            $V = V \cup \{v\}$; |
| 8:        end for |
| 9:        if $\forall v \in V : v \in p_c$ then ▷ $p_d$ is possible on control flow $p_c$ |
| 10:           $P_d^r = P_d^r \cup \{p_d\}$; |
| 11:      end if |
| 12:    end for |
| 13: return $P_d^r$; |

Before the algorithm can finally determine, whether all paths of the source-sink pair sanitized under guarantee, it needs to know the SSA ids of all the data symbols, which are sanitized using a modifying sanitizer within the current control flow path pc. In order to get this list of ids, the procedure getSanitizedSymbols is invoked.

Algorithm C.7 shows this procedure and analyzes each node of the control flow individually by checking, if the node represents an invoke statement of a modifying sanitizer. If so, the algorithm adds the parameter-ids of the invoked sanitizer to a set of ids. When each node of the path is checked, the algorithm will return the list of ids, or an empty list, if no sanitizer was invoked.

| Algorithm C.7 getSanitizedSymbols (in: $p_c$, $S_m$, D): set of symbols |
|---|
| 1:    $\lambda = \emptyset$ |
| 2:    for all $v \in p_c$ do |
| 3:        i = SSA instruction in v. |
| 4:        if $i \in S_m$ then ▷ instruction i is an invoked sanitizer |
| 5:            $\lambda = \lambda \cup$ D.uses(i); |
| 6:        end if |
| 7:    end for |
| 8:    return $\lambda$; |

Once all the required information are computed, algorithm C.4 continues with the actual analysis of the control flow path pc. For all corresponding data flow paths, the algorithm will check, if at least one SSA symbol of pd is being sanitized indirectly. If so, this data flow path will be marked as safe. Afterwards, the set of conditions Cpd is generated, which contains all conditions that are directly required by pd. This set is then used to generate a list of negated conditions. The next step uses these two sets to mark all the other corresponding data flow paths with all the negated conditions, unless they are equivalent.

In some implementations, the system integrates iterations by unrolling them up to a certain depth. The depth is a pre-defined, customizable configuration and directly influences the accuracy of this approximation as well as the required computation time of the analysis. Examples are given with iterations, but the techniques can be applied to recursions as well since recursive program structure can be replaced with iterations beforehand.

The general approach of unrolling an iteration i with the depth d is to replace the conditional circle inside the reduced graph with d acyclic conditional control flows (if-clauses). Each of these control flows has its own conditional branch, which is a modified version of the conditional branch of the iteration. While the former outgoing branch still exists, the second branch points to the following inside/change component. The actual condition of the kth if-clause needs to be modified in a way that k−1 changes already happened. The fourth component, the goto instruction, is removed, which then results in an acyclic graph. The last adjustment is that the last node of the last inside/change component points to v.

Algorithm C.8 is invoked for each iteration individually in the defined order. Additionally, it retrieves the reduced graph Gr and the Def-Use object D, both of which will be modified accordingly at the end. The last parameter is the depth d, which defines the number of unrolled iteration cycles. The algorithm starts by identifying the surrounding structure of iteration i in Gr and computes the set of predecessors P and the set of successors S. During the algorithm, this set of predecessors P is being modified after each unrolled iteration to always contain the connection points for the next unroll.

| Algorithm C.8 unrollIteration (in: i, d out: D, G'): acyclic reduced graph | |
|---|---|
| 1: | $P = \cup_{u \in v}^r$ s.t. $\exists(u, v1) \in E^r$; ▷ predecessors of i |
| 2: | $S = \cup_{u \in v}^r$ s.t. $\exists(v|_j|, u) \in E^r$; ▷ successors of i |
| 3: | c = SSA id of the conditional branch of i; |
| 4: | b = backward slice of c; |
| 5: | g = SSA id of the goto instruction that points to the condition; |
| 6: | B[d] = getNewSlices(b, d, D); |
| 7: | G' = G'\i; |
| 8: | for j = 0; j < d; j ++ do |
| 9: | i' = i\{g}; |
| 10: | replace corresponding fields of B[j] in i'; |
| 11: | add i' to G' as successor to each v ∈ P; |
| 12: | P = last node in i'; |
| 13: | end for |
| 14: | if v1 ∉ b then ▷ i is condition-last |
| 15: | remove last condition in G'; |
| 16: | end if |
| 17: | let v be the last inserted node; |
| 18: | $E^r = E^r \cup \{(v, u)\} \forall u \in S$; |

Once the surrounding sets are computed, the algorithm identifies the components of the iteration and uses the helper procedure getNewSlices to generate the new required conditions and change components for each single unroll in advance. This helper procedure extends the Def-Use object D accordingly for future reference. The next step is the integration of the modified recurring subgraph $i_0$, which contains the corresponding slice of the repetition and no longer contains the goto instruction. The first node of the subgraph $i_0$ is a direct successor of each node of the set of predecessors P and the last node of $i_0$ replaces this set. The second part ensures that the next unrolled iteration starts at the end of the current one. Afterwards, the algorithm completes the integration of the unrolled iterations and adds an edge from the last inserted node to each successor to the set of edges $E^r$ of the modified graph.

Algorithm C.9 starts with the analysis of the original backward slice b and identifies every occurring Φ cycle c. If the slice b of the corresponding iteration contains a modifying condition, it will contain at least one Φ cycle. A Φ cycle contains exactly one Φ function, which has exactly two SSA ids as uses. The first id points to the modifying instruction im of the original value and the second one to the original value itself, because the condition could either use the original value (the first iteration) or a modified one (iterations 2-d). To complete the cycle, the modifying instruction $i_m$ refers back to the Φ function, since it has the exact same options.

| Algorithm C.9 getNewSlices (in: b, d out: D): array with modified slices | |
|---|---|
| 1: | initialize B[d] with a copy of b at each position. |
| 2: | for all c ∈ b do |
| 3: | p = Φ-function of c; |
| 4: | $u_2$ = original value; |
| 5: | $i_m$ = modifying instruction of c, that uses p; |
| 6: | $i_c$ = comparing instruction of b, that uses p; ▷ ingoing edge to the Φ-cycle |
| 7: | for j = 0; j < d; j++ do |
| 8: | $i'_m$ = copy of $i_m$, that uses $u_2$ instead of p; |
| 9: | $i'_c$ = copy of $i_c$, that uses $u_2$ instead of p; |
| 10: | replace $i_m$ with $i'_m$ and $i_c$ with $i'_c$ including all their uses in B[j]; |
| 11: | remove p from B[j]; |
| 12: | extend D with new entries for all modified instructions of B[j]; |
| 13: | $u_2$ = id of $i'_m$; ▷ the next unrolled iteration then uses the values of the prior one |
| 14: | end for |
| 15: | end for |
| 16: | return B; |

In case the backward slice does not contain at least one P cycle, the condition does not automatically change within the iterations (e.g., while (is True( ))) and the algorithm returns the original slice d times in the according array B[d]. In any other case, the algorithm replaces the cyclic condition and change components with a sequence of individual conditions and changes, which refer directly to the previous ones. This approach unrolls the P cycle and allows the algorithm C.8 to use these new slices directly, since they automatically behave the way they would have in the original iteration.

The system generates a security report for the application (312). The system can generate the security report in any of various formats or display preferences. Typically, the security report includes a list of exploitable source-sink pairs. In some implementations, the security report includes only exploitable source-sink pairs determined to be exploitable in at least one possible context and excludes source-sink pairs not determined to be exploitable in at least one possible context.

Figure 4:
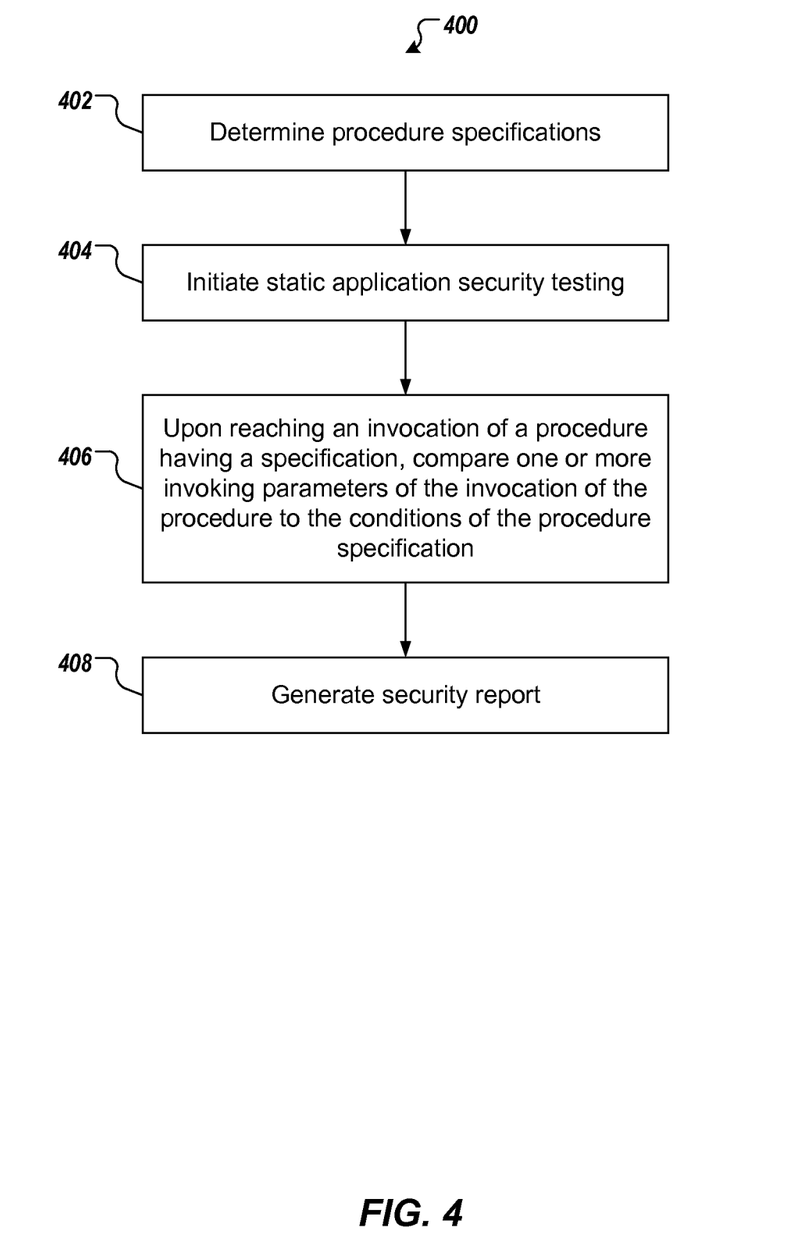
FIG. 4 depicts an example process that can be executed in accordance with implementations of the present disclosure.

FIG. 4 depicts an example process 300 that can be executed in accordance with implementations of the present disclosure. In some examples, the example process 300 can be provided as one or more computer-executable programs executed using one or more computing devices. For purposes of illustration, the process 300 will be described with respect to a system that performs the process 300, e.g., the application analysis system 100 of FIG. 1.

The system determines procedure specifications for one or more procedures of an application using application source code (402). In some implementations, determining the procedure specification of a procedure includes combining return statements so that each procedure has one return statement; determining an intermediate representation of the source code; and describing the procedure in terms of an Extended Backus-Naur Form (EBNF) or similar format. The system can determine procedure specifications before beginning SAST or upon reaching a procedure for the first time while performing SAST.

The system can use algorithms that work with both data sources and data sinks; however, in some implementations, the system does not need an additional statement to specific sinks. The system can start with identifying possible sinks, e.g., all possible sinks, and then analyzing them individually using backward slicing. Example algorithms are set forth below in pseudo code but the system can use other algorithms.

The approach is a two part algorithm and is combined and controlled by the main modularization algorithm D.1. The first part analyzes a procedure and computes the corresponding expression (here and after known as description d), e.g., using a specified grammar. This part is executed only once for each procedure, usually when the procedure is called for the first time. Afterwards the procedure should be marked as analyzed and linked to the computed description. The decision depends on the focus of the implementation. It can vary from a simple local list inside the analysis tool, up to hard coded annotations, which can be inserted permanently into the source files. The second variation has the advantage that the computed descriptions can be reused at another time, but it further adds the constraint that the analysis tool needs to know, whether a procedure is being modified since the last computation, or not.

```
Algorithm D.1 analyzeId (in: proc, c, s, V): interpretation set

1:    if proc has no valid description then
2:        generateDescription(proc);
3:    end if
4:    d = getDescription(proc)
5:    return interpretDescription(d, s, V, c)
```

The second part of the algorithm interprets the prior computed description to the requested context. The algorithm interpretDescription checks the description d, how the SSA data symbol s is modified by the procedure proc with regard to given condition c and the possibly exploitable vulnerabilities V. The returning interpretation set is a set of pairs (c, delta), where c is an internal condition and delta is the corresponding information set.

```
Algorithm D.2 generateDescription (in: proc)

1:    compute or retrieve P_d, G', D and C for proc.
2:    for all p ∈ P_d do  ▷ for each path
3:        for all id_i ∈ p do
4:            v = node of id_i in G'.
5:            if v ≠ NULL then  ▷ id_i is not a constant value
6:                c_v is set of conditions for v in C.
7:                c = ∧_{ci∈cv} c_i;
8:                cond = cond ∧ c;
9:            end if
10:       end for
11:       if cond is satisfiable then
12:           stmts = "";
13:           N = ∅;
```

```
Algorithm D.2 generateDescription (in: proc)

14:           for all return symbol r do  ▷ for each possible data
15:               getDescriptionForPath(p, r, r, D, stmts, N);  ▷ N and stmts will be filled
16:           end for
17:           if N! = ∅ then
18:               parts = {<cond, stmts>};
19:               combineNestedDescriptions(N, parts)  ▷ fills parts
20:               for all k ∈ parts do
21:                   part = ";" + k.cond + k.stmts;
22:               end for
23:           else
24:               part = ";" + cond + stmts;
25:           end if
26:           desc = desc + part;
27:       end if
28:   end for
29:   link complete description desc to procedure
```

The analysis can be executed once for each procedure, no matter how often this procedure is actually invoked. The goal of the analysis algorithm is to compute a textual representation of the procedure, which describes the behavior context aware regarding the data flow.

Algorithm D.2 starts by analyzing each path separately. The conditions that influence the behavior of the invoked procedure—to lead exactly to this path pi—are computed by the iterating over the corresponding nodes the path and combining the individual conditions. The second part of the description, besides the required condition, is the set of data flow statements. The procedure getDescriptionForPath computes valid statements of the given data symbol with consideration of the given path. This computation needs to be done for each return value within the combined return statement. In addition to the statements, this algorithm will fill an empty set N with internal descriptions, if the analyzed procedure invokes subroutines as well.

Algorithm D.3 is a recursive algorithm that successively analyzes one specific path p of the backward slice, starting at one value id of the return statement. The outgoing parameters stints and N are passed through the recursive calls to enable the algorithm to add relevant data flow information whenever they occur.

Since the DefUse object D is initialized with information about the whole procedure instead of just the path, it contains all the different branches, which are possible from this single value id. These branches are considered due to the fact, that the complete backward slice is divided into its paths. Nevertheless, D can include obsolete functions and the algorithm skips over them by proceeding with the one branch that is part of the path p.

Whenever the algorithm reaches an invoke statement, it will use the subroutines getSourceInformation and getSanitizeInformation to identify previously known sources or sanitize procedures and to insert that knowledge into the description. If neither of them recognized the invoke statement, the algorithm analyzes it itself. The set of nested descriptions N is extended by the description of the nested procedure and will be considered later.

All the other instructions on the path can be considered irrelevant for this analysis, since they do not modify used data. They at most combine data symbols, which is handled by the algorithm with analyzing each used data symbol individually.

If the algorithm does not reach a stopping point on the path, it will end either at a local constant value or a data symbol. Hard coded constant values are handled like a complete sanitize procedure and the algorithm includes the safe item accordingly. Data symbols with no concrete value on the other hand are represented in the description by the corresponding dataflow item.

---

Algorithm D.3 getDescriptionForPath (in: p, r, i, D out: stmts, N)

```
1:   j = D.def(i);  ▷ j is the SSA instruction with id i
2:   if j is Φ-function then
3:       getDescriptionForPath(p, r, k, D , stmts, N) ▷ let k
                      be the one use of j ∈ p
4:   else if j is invoke instruction then
5:       src = getSourceInformation(j);
6:       san = getSanitizeInformation(j);
7:       if src != NULL then
8:           stmts += "source(" + r + "," src.list + ")";
9:       else if san != NULL then
10:          stmts += "safe(" + r + "," san.type + ")";
11:      else ▷ the nested invoked instruction needs to be
                  analyzed
12:          if j has no valid description then
13:              generateDescription(j);
14:          end if
15:          d = getDescription(j)
16:          N ∪ d
17:      end if
18:  else if j == NULL then ▷ j is a data object
19:      if j is a data symbol then
20:          stmts += "dataflow(" + j + "," r + ")";
21:      else ▷ j is a constant value
22:          v = the value of j in D;
23:          stmts += "value(" + j + "," v + ")";
24:      end if
25:  else ▷ j represents an SSA instruction that is not of
                current interest
26:      for all k ∈ D.uses(i) do ▷ these branches are internal
                      and do not invalidate the path
27:          getDescriptionForPath(p, r, k, D , stmts, N)
28:      end for
29:  end if
```

---

The approach, introduced in this section, handles the integration between two directly connected hierarchical levels of the call graph and prevents the analysis algorithm to analyze the full depth every time, the procedure is invoked. If the hierarchy of the call graph has n levels, this integration will need to be invoked n−1 times.

---

Algorithm D.4 combineNestedDescriptions (in: N out: parts)

```
1:   parts_temp = ∅;
2:   for all n ∈ N do ▷ for each nested procedure
3:       for all outer part p_o ∈ parts do
4:           for all inner part p_i ∈ n do
5:               adjust the ids of p_i to the namespace of p_o.
6:               c = p_o.cond ∧ p_i.cond;
7:               if c is satisfiable then
8:                   s = p_o.stmts ∪ p_i.stmts;
9:                   delete obsolete statements in s.
10:                  parts_temp = parts_temp ∪ <c, s>;
11:              end if
12:          end for
13:      end for
14:      parts = parts_temp;
15:      parts_temp = ∅;
16:  end for
```

---

Algorithm D.4 starts with a nested loop over N to handle each invoked procedure individually. The different parts of each invoked procedure (inner parts) need to be combined pairwise with each part of the invoking procedure (outer parts), which is—at the very beginning—the description of this invoking procedure. Once each pair of inner and out parts is analyzed and combined, all the invoked procedures and their data flows are integrated into the outgoing parameter parts. This description can be reused every time the procedure is invoked.

The system initiates SAST on the application using the source code (404). The system can begin at an entry point and work towards an exit point. For example, the system can use the process 300 described above with reference to FIG. 3.

The system, upon reaching an invocation of a procedure having a specification, compares one or more invoking parameters of the invocation of the procedure to the conditions of the procedure specification (406). Although the analysis of a procedure need only be executed once for each invoked procedure, the interpretation can be executed every time the procedure is invoked, because it includes the invoking context.

Algorithm D.5 computes every possible variation of the given SSA id s, based on the combination of the procedure description d and the context, which is given as condition c. Since the description d is a list of different possible control flows (parts), the algorithm gathers the globally required information by iterating over the individual parts. Each part contains a condition cp, that is checked against the condition c.

In case that the part p is indeed possible, the algorithm analyzes each item i of this part separately. If an item contains the id s, then the corresponding information will be stored in the according set. Even if there are four types of items, the analysis can be done with only three different sets. The safeItem and the valueItem can be collected in a set that represents the safeness, since a constant value is safe per definition. Once all items are considered, the algorithm extends the interpretation set with the current findings. In the special case, when the set of secured vulnerabilities either contains 'all', or contains every single vulnerability of the given set V, the findings are combined to the completely ensured value 'all'. After the analysis of all possible parts, the combination of all parts is returned as a set, which is then interpreted by the global analysis.

---

Algorithm D.5 interpretDescription (in: d, s, V, c): interpretation set

```
1:   parts = set of parts in d;
2:   δ = ∅;
3:   for all p ∈ parts do
4:       c_p = condition of p;
5:       if c_p ∧ c is satisfiable then
6:           I = set of items in p;
7:           S = ∅; ▷ S is the set of secured
                        vulnerabilities
8:           C = ∅; ▷ C is the set of traced constant
                        values
9:           T = ∅; ▷ T is the set of traced sources
10:          D = ∅; ▷ D is the set of traced data ids
11:          for all i ∈ I do
12:              i_1 = first parameter of i;
13:              i_2 = second parameter of i;
14:              if s ∈ {i_1, i_2} then
15:                  if i == safeItem then
16:                      S ∪ i_2;  ▷ i_2 is a set of sanitized
                                       vulnerabilities
17:                  else if i == dataFlowItem then
18:                      D ∪ {i1}; ▷ there is a data flow from
                                        i_1 to s
19:                  else if i == sourceItem then
20:                      T ∪ {i_1};
21:                  else if i == valueItem then
```

-continued

Algorithm D.5 interpretDescription (in:
d, s, V, c): interpretation set

```
22:                         C ∪ {i₂};
23:                       end if
24:                    end if
25:                 end for
26:                 R = D ∪ T;
27:                 if R ≠ Ø then
28:                     δ = δ ∪ {(c,R)};
29:                 else if C ≠ Ø then
30:                     δ = δ ∪ {(c,C)};
31:                 else if 'all' ∈ S | V ⊂ S then
32:                     δ = δ ∪ {(c,'all')};
33:                 else
34:                     δ = δ ∪ {(c, S)};
35:                 end if
36:         end if
37:     end for
38:     return δ;
```

The system generates a security report (408). The system can generate the security report in any of various formats or display preferences.

Figure 5:
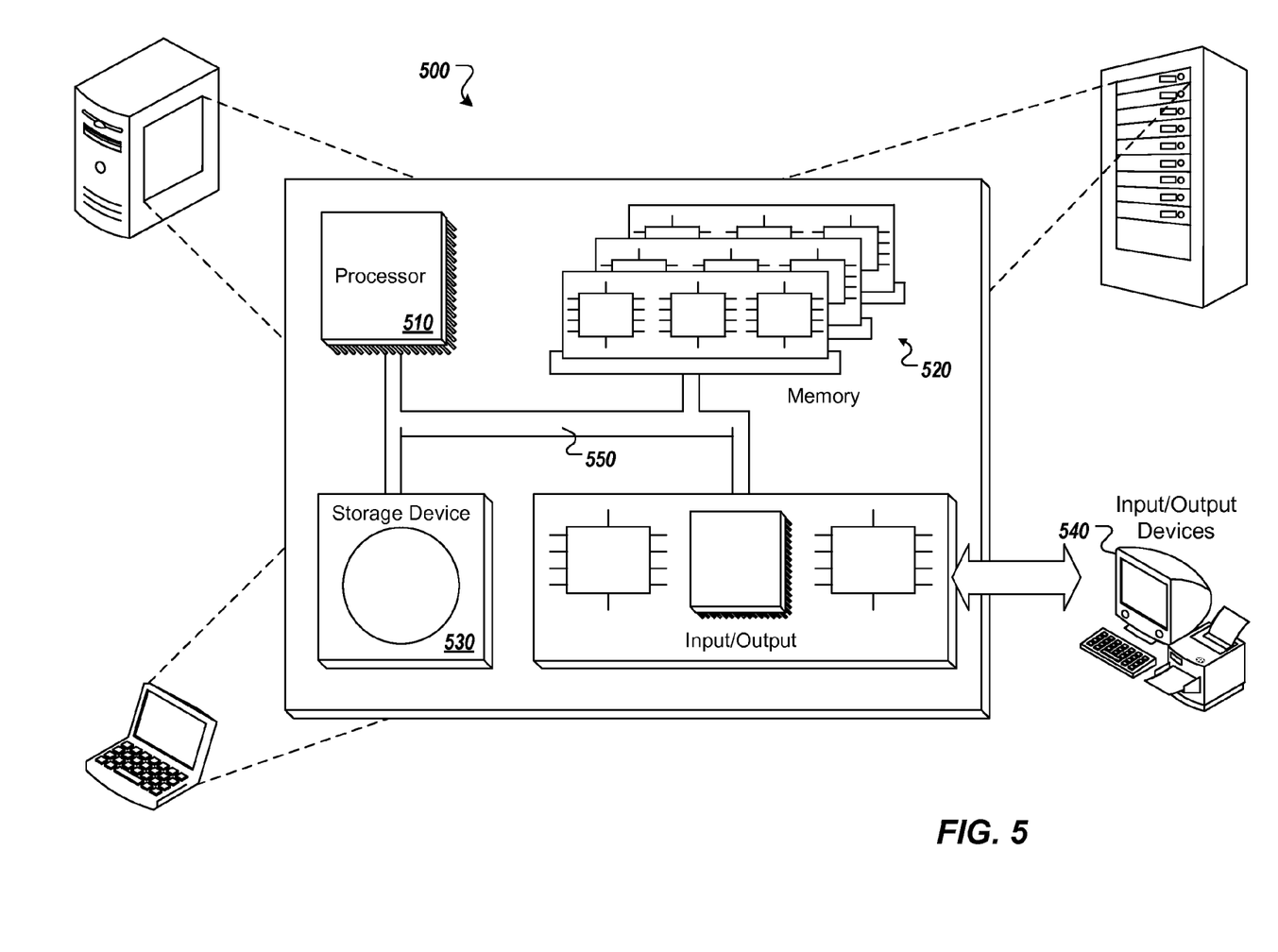
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 650 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 800. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for analyzing source code of an application, the method being executed using one or more processors and comprising:
   determining, for at least one procedure invoked by the source code, a procedure specification specifying one or more conditions under which one or more parameters of the procedure are exploitable according to a parameter security specification, the one or more parameters comprising a data sink having a data source as a predecessor in a control flow graph;
   performing static application security testing on the source code by using the procedure specification on reaching an invocation of the procedure in the source code, comprising:
      comparing one or more invoking parameters of the invocation of the procedure to the conditions of the procedure specification; and
      determining whether, in at least one context of the application, the invocation of a first condition associated to the data sink indicating that the data sink is exploitable is simultaneously satisfied with a second condition associated to the data source indicating that the data source is exploitable based on an analysis of an exclusion criteria.

2. The method of claim 1, wherein performing static application security testing on the source code comprises:
   reaching at least first and second invocations of the procedure in the source code;
   using the procedure specification to determine whether each of the first and second invocations of the procedure are exploitable according to the parameter security specification without accessing the source code of the procedure.

3. The method of claim 1, further comprising determining a respective module specification for each module of a plurality of modules of the source code.

4. The method of claim 1, wherein the parameter security specification specifies one or more types of data sources as being unsafe data sources.

5. The method of claim 1, wherein the parameter security specification specifies one or more types of data sinks as being vulnerable data sinks.

6. The method of claim 1, wherein determining whether the invocation of the module is insecure comprises:
   determining that a first invoking parameter has a data type specified by the parameter security specification as an exploitable data source;
   determining, using the module specification, that the first invoking parameter forms a data flow to a first parameter of the module specified by the parameter security specification as being an exploitable data sink, thereby determining that one or more conditions specified in the module specification are met for the invocation of the module.

7. The method of claim 1, further comprising, for each procedure of the source code, combining return statements so that each procedure has one return statement.

8. The method of claim 1, further comprising generating an intermediate representation of the source code independent of a programming language used to write the source code of the at least one procedure.

9. The method of claim 8, wherein the intermediate representation of the source code is based on the T. J. Watson Libraries for Analysis (WALA) infrastructure.

10. The method of claim 9, wherein the intermediate representation is designed in a single static assignment (SSA) form.

11. The method of claim 1, further comprising determining a control flow graph of the at least one procedure using the source code of the application, wherein the control flow graph includes a plurality of nodes each representing a linear sequence of instructions and a plurality of edges connecting nodes, each edge representing an invocation of one connected node's instructions by the other connected node's respective instructions.

12. The method of claim 1, further comprising incorporating an identification of a sanitization procedure into the specification of the at least one procedure.

13. A non-transitory computer-readable storage medium coupled to one or more processors and having instructions stored thereon which, when executed by the one or more processors, cause the one or more processors to perform operations for analyzing source code of an application, the operations comprising:
   determining, for at least one procedure invoked by the source code, a procedure specification specifying one or more conditions under which one or more parameters of the procedure are exploitable according to a parameter security specification, the one or more parameters comprising a data sink having a data source as a predecessor in a control flow graph;
   performing static application security testing on the source code by using the procedure specification on reaching an invocation of the procedure in the source code, comprising:
      comparing one or more invoking parameters of the invocation of the procedure to the conditions of the procedure specification; and
      determining whether, in at least one context of the application, the invocation of a first condition associated to the data sink indicating that the data sink is exploitable is simultaneously satisfied with a second condition associated to the data source indicating that the data source is exploitable based on an analysis of an exclusion criteria.

14. A system, comprising:
   a computing device; and
   a non-transitory computer-readable storage device coupled to the computing device and having instructions stored thereon which, when executed by the computing device, cause the computing device to perform operations for analyzing source code of an application, the operations comprising:
      determining, for at least one procedure invoked by the source code, a procedure specification specifying one or more conditions under which one or more parameters of the procedure are exploitable according to a parameter security specification, the one or more parameters comprising a data sink having a data source as a predecessor in a control flow graph;
      performing static application security testing on the source code by using the procedure specification on reaching an invocation of the procedure in the source code, comprising:
         comparing one or more invoking parameters of the invocation of the procedure to the conditions of the procedure specification; and determining whether, in at least one context of the application, the invocation of a first condition associated to the data sink indicating that the data sink is exploitable is simultaneously satisfied with a second condition associated to the data source indicating that the data source is exploitable based on an analysis of an exclusion criteria.

\* \* \* \* \*